United States Patent [19]
Eckhardt

[11] Patent Number: 6,104,536
[45] Date of Patent: Aug. 15, 2000

[54] HIGH EFFICIENCY POLARIZATION CONVERTER INCLUDING INPUT AND OUTPUT LENSLET ARRAYS

[75] Inventor: Stephen K. Eckhardt, Austin, Tex.

[73] Assignee: 3M Innovative Properties Company, Saint Paul, Minn.

[21] Appl. No.: 09/156,148

[22] Filed: Sep. 18, 1998

[51] Int. Cl.$^7$ .................................................. G02B 27/10
[52] U.S. Cl. ......................... 359/619; 359/621; 359/622
[58] Field of Search .................. 359/619, 621, 359/622, 623, 624, 625, 626

[56] References Cited

U.S. PATENT DOCUMENTS

| | | | |
|---|---|---|---|
| 2,748,659 | 6/1956 | Geffcken et al. .......................... | 88/65 |
| 2,821,114 | 1/1958 | Wiemer et al. .............................. | 88/65 |
| 3,213,753 | 10/1965 | Rogers ........................................ | 88/65 |
| 3,508,809 | 4/1970 | Wilder et al. ............................. | 350/157 |
| 3,528,723 | 9/1970 | Rogers ..................................... | 350/157 |
| 3,555,987 | 1/1971 | Browning ................................. | 396/457 |
| 4,798,448 | 1/1989 | van Raalte ............................... | 350/345 |
| 5,124,841 | 6/1992 | Oishi ....................................... | 359/487 |
| 5,278,680 | 1/1994 | Karasawa et al. ........................ | 359/40 |
| 5,381,278 | 1/1995 | Shingaki et al. ......................... | 359/256 |
| 5,387,953 | 2/1995 | Minoura et al. .......................... | 353/20 |
| 5,461,500 | 10/1995 | Tsuji et al. ................................ | 359/48 |
| 5,555,186 | 9/1996 | Shioya ...................................... | 359/40 |
| 5,556,367 | 10/1996 | Mitsutake et al. ....................... | 359/497 |
| 5,566,367 | 10/1996 | Mitsutake et al. ....................... | 359/497 |
| 5,650,873 | 7/1997 | Gal et al. ................................. | 359/487 |
| 5,751,480 | 5/1998 | Kitagishi ................................. | 359/485 |
| 5,757,547 | 5/1998 | Rodman et al. .......................... | 359/497 |
| 5,764,412 | 6/1998 | Suzuki et al. ............................ | 359/487 |

FOREIGN PATENT DOCUMENTS

| | | | |
|---|---|---|---|
| 0 777 146 A1 | 6/1997 | European Pat. Off. ........ | G03B 21/00 |
| 10 111535 | 4/1998 | Japan .............................. | G03B 21/20 |
| WO 95/17691 | 6/1995 | WIPO .............................. | G02B 5/30 |
| WO 95/17699 | 6/1995 | WIPO ........................... | G02F 1/1335 |
| WO 95/27919 | 10/1995 | WIPO ............................. | G02B 27/28 |
| WO 96/35140 | 11/1996 | WIPO . | |

*Primary Examiner*—Georgia Epps
*Assistant Examiner*—Ricky Mack
*Attorney, Agent, or Firm*—Nestor F. Ho

[57] ABSTRACT

A lenticular polarization converter for polarizing a beam of unpolarized light is described. The polarization converter includes an input lenslet array, a polarizing stack, and an output lenslet array, all arranged sequentially and optically aligned. The input lenslet array has two major surfaces, the first of which has an array of curved surfaces to focus light and the second of which has alternating transmissive and reflective regions. The beam of light is focused by the input lenslets through the transmissive regions onto the polarizing stack. The polarizing stack transmits a first polarization component and reflects a second polarization component towards the reflective regions. The second polarization component is circularly polarized by the polarizing stack and is reflected by the reflective surfaces. The circularly polarized component passes again through the polarizing stack and is linearly polarized, allowing the component to pass through the polarizer. An output lenslet array is used to align the now polarized beam in a desired direction of travel.

25 Claims, 12 Drawing Sheets

HIGH EFFICIENCY POLARIZATION CONVERTER INCLUDING INPUT AND OUTPUT LENSLET ARRAYS

BACKGROUND OF THE INVENTION

The present invention relates to a polarization converter that efficiently converts substantially normally incident unpolarized light into linearly polarized light. More specifically, the present invention relates to a relatively thin lenticular polarization converter and to liquid crystal display (LCD) projection system designs including the novel thin polarization converter, for example, full-color LCD projection systems.

Polarization dependent spatial light modulators, such as some LCD devices, require polarized light. Two challenges in designing polarization converters for use with LCD devices are compactness and efficiency. A compact planar polarization device that efficiently converts unpolarized light to polarized light would aid greatly in the design of compact and portable LCD devices.

Unpolarized light may be decomposed into a linear s-polarization component and an orthogonal p-polarization component. A method for producing polarized light for a LCD projection panel comprises the use of a polarizing beam splitter (PBS) cube or rectangular prism. One linearly polarized component of the light is transmitted by the PBS cube and directed to the LCD panel, while the orthogonal component is reflected away in a perpendicular direction. Other devices use non-cubic polarization splitters (non-rectangular prisms). Both the cubic and the non-cubic devices have a considerable longitudinal dimension (in the direction of travel of light) in relation to its transverse dimension. (An exemplary device has thickness dimensions that are approximately one fourth of the width dimensions.)

Another common method for producing polarized light comprises the use of an absorbing dye or iodine based polarizer film positioned between the light source and the LCD panel. The absorbing film transmits a single component linear polarized light, while absorbing the orthogonal component. Accordingly, the maximum conversion efficiency that may be achieved with an absorbing polarizer is 50% or less. The absorbing polarizer film is often integrally incorporated into the commercial LCD panel. Alternatively, a separate polarizer plate may be positioned between the light source and LCD.

Both a plain PBS cube and an absorbing polarizer are inefficient, in that a maximum of only one-half of the available light from the source is converted to polarized light for transmission through the LCD panel. Attempts have been made to recycle the reflected polarization component from a PBS cube. However, solid glass PBS cubes are bulky and impractical for applications in which the diagonal of the spatial light modulator exceeds approximately 50 mm.

Some existing polarization converters include lenslet arrays followed by a polarizing component. The lenslet array commonly includes an array of "Galilean telescopes", that is, the first surface of the array has convex lenslets that focus the light and the second surface has concave lenslets to recollimate the light. The lenslets on the second surface are smaller than those on the first so the intervening spaces can be used to convert the light from one polarization state to another. The component that converts the polarization state is always in the light path following the recollimating lenslets.

Recently, reflective polarizing sheet films have been developed. Use of a reflective polarizing sheet film, instead of an absorbing sheet polarizer, allows for the possibility of reflecting back the s-polarization component of a light beam in the direction of the light source. Methods have been described that return the reflected polarized light to a reflector behind the light source, and back to the LCD panel. However, these methods require extremely precise alignment of the optical components for efficient recycling of the light and are not easily suitable for compact applications.

FIG. 1 illustrates a polarization converter 10 depicted in U.S. Pat. No. 5,566,367. A beam of incident unpolarized and collimated light 70 is compressed into collimated sub-beams 72 by a lenticular element 20. The lenticular element includes an entrance surface 22 and an exit surface 30. The entrance surface is comprised of converging lenslets 24, while the exit surface has diverging lenslets 34. The resulting sub-beams 72 are incident upon a prismatic element 40. Linearly polarized beams 74 exit the prismatic element 40. The prismatic element 40 includes entrance side prisms 42, a series of quarter-wave retarder films 44, and exit side prisms 46. The exit side prisms 46 have reflective polarization beam splitting coatings 50 on one of their faces and total reflection mirrors 52 on another. As may be appreciated by the light paths described, this polarization converter design requires precise thickness control and precise registration between the elements. The polarization converter further requires collimated light. The deposition of the required coatings on selective prismatic surfaces presents significant manufacturing challenges, as does the assembly of the prisms with retarder films.

Other systems attempt to improve efficiency by recycling the reflected polarized light from various types of polarization producing films without returning the light to the light source. Some of these systems use polarization conversion devices that use holographic optical elements to separate the polarization components. All of these systems can take up considerable space and are not suitable for compact applications or for large-gate LCD panels.

SUMMARY OF THE INVENTION

The present invention is directed to an efficient lenticular polarization converter for polarizing unpolarized light. The polarization converter includes an input lenslet array, an output lenslet array, and a polarizing stack including a polarizer film located between the lenslet arrays.

The input lenslet array includes a first surface having a plurality of focusing lenslets. Each lenslet has a focus where the incoming light is concentrated. The output lenslet array includes a plurality of collimating lenslets. The polarizing stack includes a reflective polarizer and a quarter wave retarder or another arrangement that reflects circularly polarized light while transmitting linearly polarized light. The focusing lenslet array, polarizing stack and the collimating lenslet array are stacked and optically aligned with respect to each other.

When the light from each lenslet impinges on the reflective polarizer, the polarizer reflects one of the polarization components along a reflection path. The input lenslet array includes a second surface comprising interdigitated reflective surfaces and transmissive surfaces. Each transmissive surface is optically aligned with the focus of a lenslet. The reflective surfaces are generally aligned with the reflection path of the reflected polarization component. In an alternative embodiment, wherein the retarder is not necessarily a quarter wave retarder, the retarder and the reflective surfaces combine to rotate light reflected by the reflective polarizer 90 degrees.

In a preferred embodiment, the focusing lenslets and the collimating lenslets are positive lenses. The reflective surfaces of the input lenslet array comprise concave curved mirror surfaces. The alternating transmissive surfaces are generally flat transmissive aperture regions, wherein each aperture region is aligned with the focus of one of the focusing lenslets.

In other embodiments, the polarization converter further includes an optical spacer element placed between the focusing lenslet array and polarizing stack. In further embodiments, the spacer element matches the shapes of the opposing surfaces of the lenslet array and polarizing stack; such as to limit or eliminate any air gaps. That is, the surface of the spacer element opposite the reflective surface is shaped to correspond to the topography of the second surface of the focusing lenslet array.

The focusing and collimating lenslet arrays may be cylindrically symmetric or rotationally symmetric; cylindrical lenslets have a line focus while spherical lenslets have a point focus. The collimating lenslet may include convex lenses or alternating convex and concave lenses.

An important aspect of the novel optical design of the present invention is the placement of the polarizing component between the focusing lenslets and the recollimating lenslets. This arrangement allows for the elimination of all but two of the surfaces at which substantial Fresnel surface reflection can occur. The reduction of Fresnel reflections leads to an improvement on the throughput of the device and reduces or eliminates antireflection coating costs. Alternative designs may also leave an air gap within the assembly if that configuration is favorable to the particular usage.

DETAILED DESCRIPTION OF THE INVENTION

Figure 1:
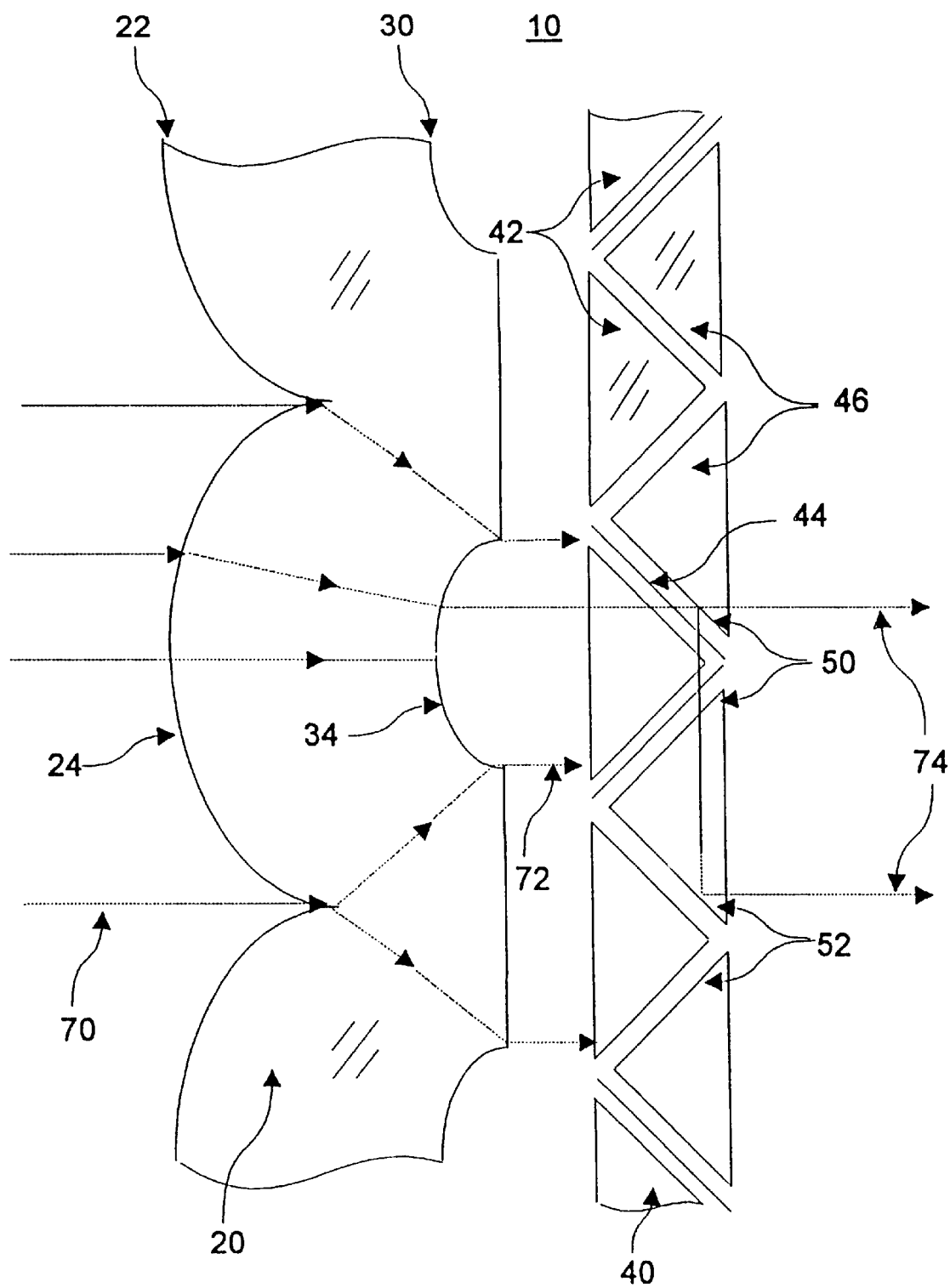
FIG. 1 is a cross-sectional elevation view of a prior art polarization converter.
Figure 2:
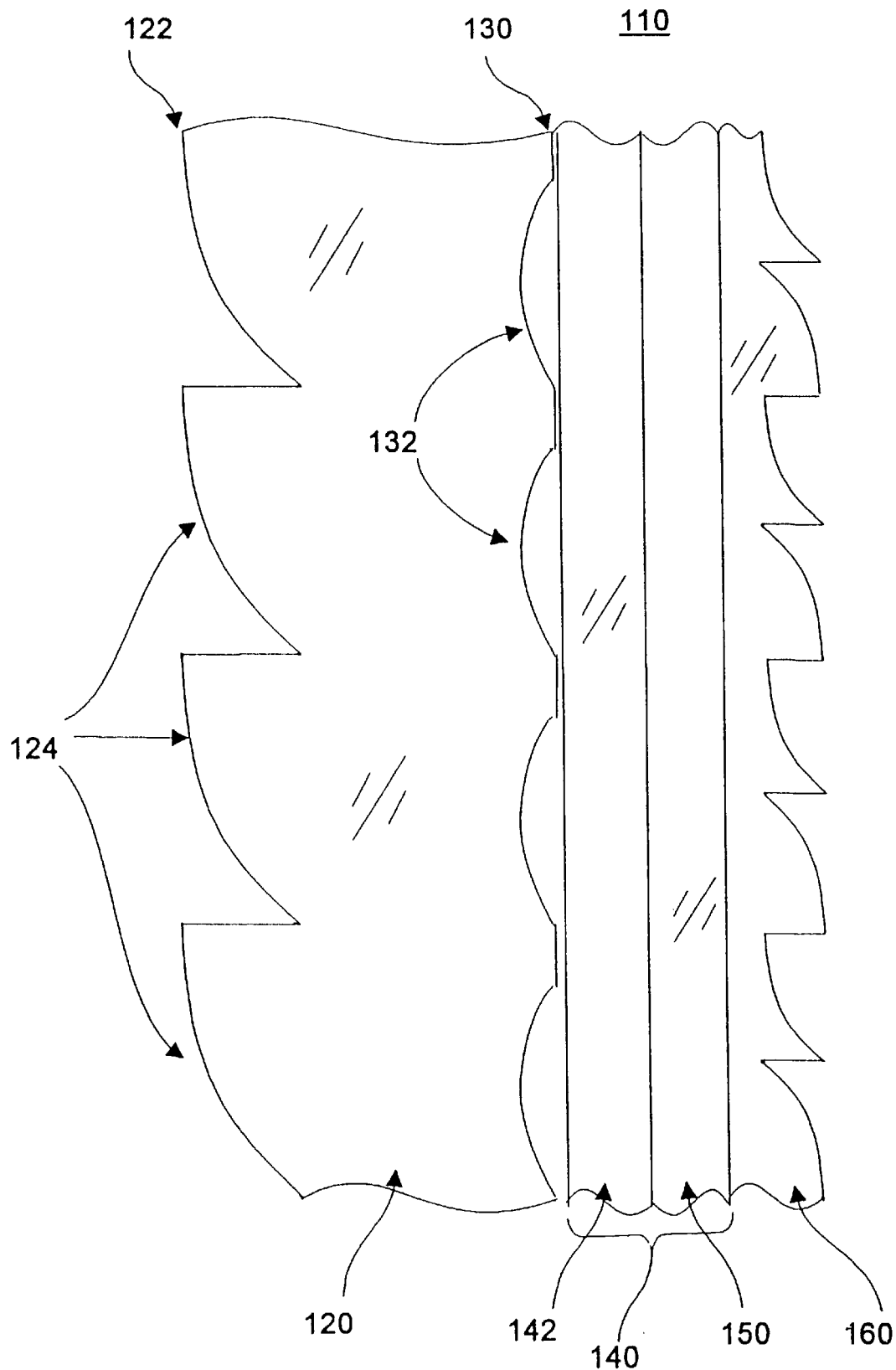
FIG. 2 is a cross-sectional elevation view of a first planar polarization converter in accordance with the present invention.
Figure 3:
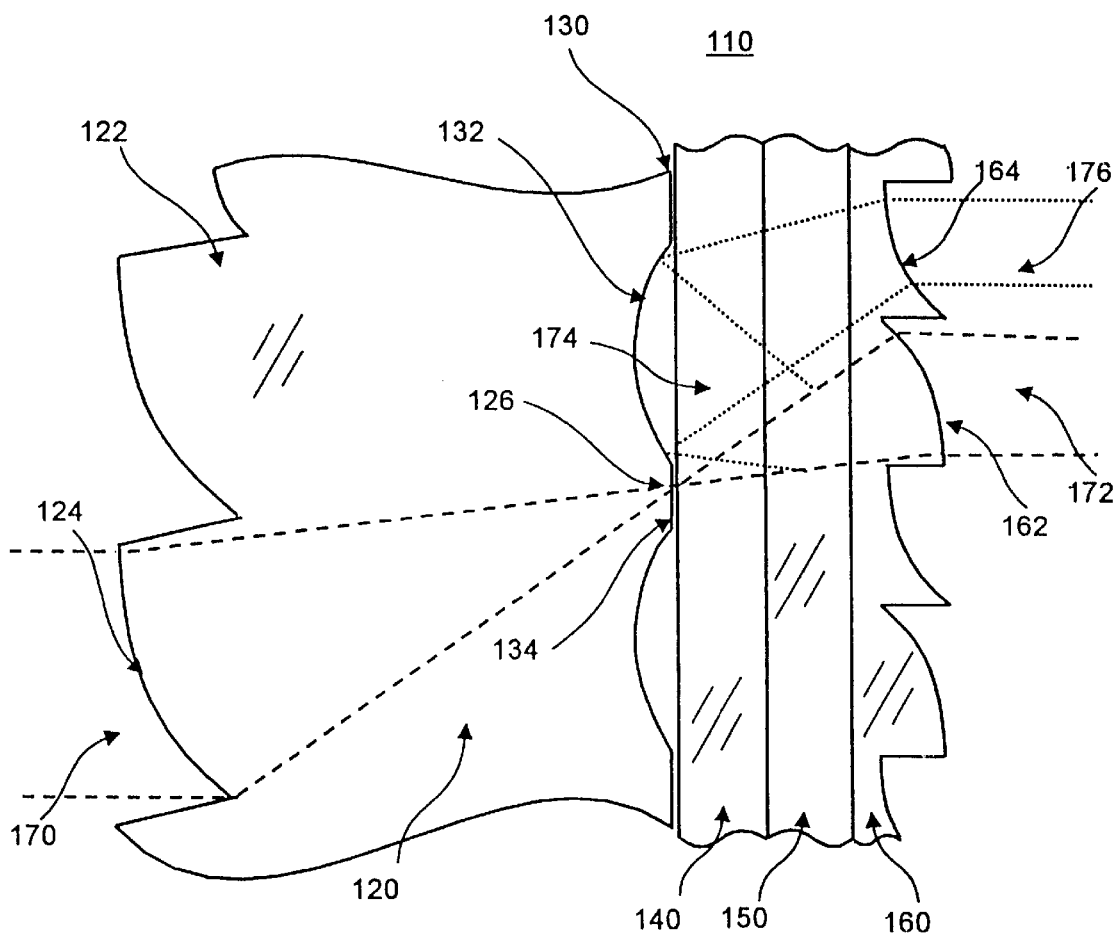
FIG. 3 is a cross-sectional elevation view of a detail of the planar polarization converter illustrated in FIG. 2.

FIGS. 2 and 3 illustrate a first polarization converter 110 in accordance with the present invention. The polarization converter 110 is a generally planar, thin, multi-layer structure. The polarization converter 110 includes an input lenslet array element 120, a polarizing stack 140, 142, and an output lenslet array element 160. The polarizing stack 140 includes a quarter wave retarder film 142 and a reflective polarizer film 150. The elements are stacked, optically aligned and arranged sequentially.

The input lenslet array element 120 is generally planar, having a first major surface and a second major surface. The first major surface, focusing surface 122, includes a plurality of focusing lenslets 124. Each lenslet 124 has an optical focus 126, as illustrated in FIG. 3.

The second major surface of the input lenslet array element 130, illustrated in FIGS. 2 and 3, is adjacent the quarter wave retarder film 142. The second major surface 130 includes a plurality of reflective regions, such as curved concave mirror surfaces 132, used to reflect and refocus the light reflected by the reflective polarizer 150. The curved concave mirror surfaces 132 may be spherical, elliptical, or some other optimized shape that maximizes throughput while minimizing aberrations. The reflective surface 130 is a reflective/transmissive surface, as the curved mirror surfaces 132 are interdigitated or alternated with a number of generally flat transmissive aperture regions 134. The transmissive regions 134 preferably are generally flat regions generally perpendicular to the incident beam and are optically aligned with the focus 126 of the lenslets 124, such that the beam focused by each lenslet passes undisturbed through a transmissive region 134. The transmissive regions also are preferably shaped and oriented so that the quarter wave retarder can be optically adhered to them to minimize refraction and reflection losses. Those skilled in the art will recognize that the transmissive regions may be placed at a variety of angles with respect to the incident beam of light without significantly reducing the transmission efficiency. As illustrated in FIG. 3, the focal length of the lenslets 124 is a generally equal to or greater than the thickness of the lenslet array element 120.

Figure 12:
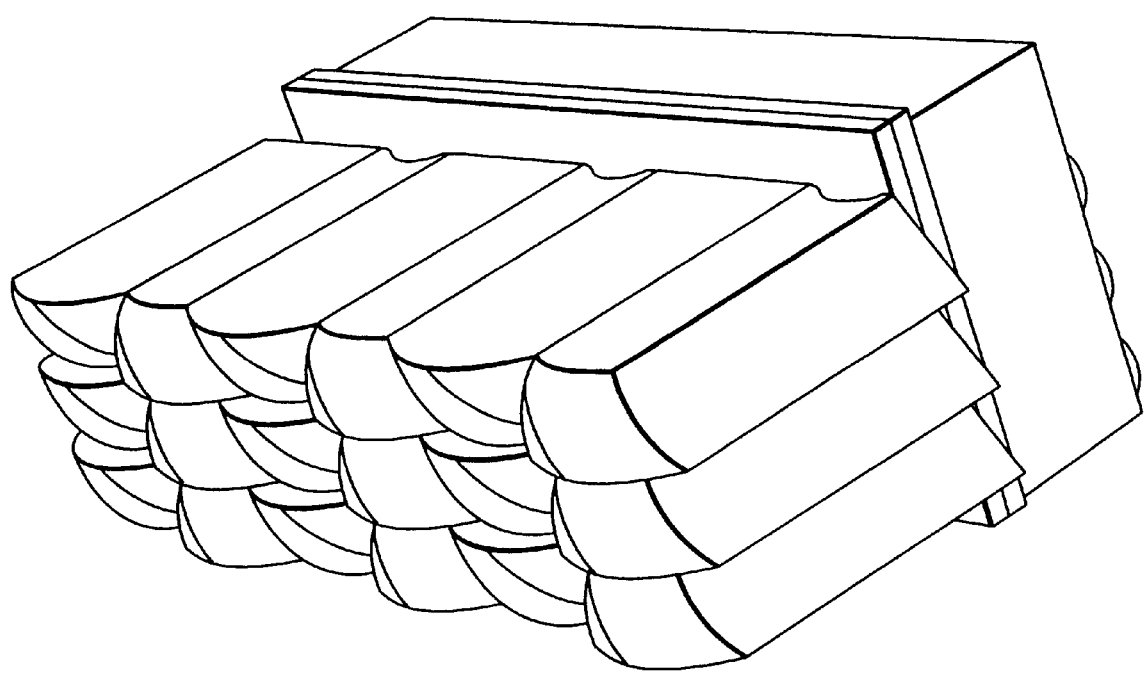
FIG. 12 is an enlarged perspective view of an embodiment of the planar polarization converter illustrated in FIG. 11 including rotationally symmetric lenslets.

In one embodiment, the lenslet array element has a thickness of roughly one-half to five millimeters. The film lenslet array element may be molded or extruded from any optically clear plastic or glass, preferably one with low birefringence. The lenslets 124 may be disposed in a cylindrically symmetric configuration, as illustrated in FIG. 3, or a rotationally symmetric configuration, as illustrated in FIG. 12. An advantage of the cylindrically symmetric structure is that it only doubles the angular extent of an impinging beam 170 in one direction thus making it easier to couple more lamp power into a small spatial light modulator and a slow lens. The cylindrically symmetric arrangement does require substantially collimated input light. The rotationally symmetric arrangement doubles the angular extent of the impinging beam in both directions transverse to the beam. However, the arrangement allows the use of substantially converging or diverging light without a collimator.

The polarizing stack 140 is positioned between the input and output lenslet arrays 120 and 160. The polarizing stack 140 transmits a first component and reflects a second component of the unpolarized light beam. In the present embodiment, the polarizing stack includes the quarter wave retarder 142 and a reflective linear polarizer 150. The quarter wave retarder 142 is a generally planar film, such as a wide-band type quarter-wave retarder, e.g., the Polaroid ¼ wave retarder, PID#605206 from Polaroid Corporation, Norwood, Mass.

The reflective polarizer 150 similarly is a generally planar film, such as 3M Dual Brightness Enhancement Film (DBEF) from 3M, St. Paul, Minn. Other thin reflective polarizer films may be used, such as those disclosed in U.S. patent applications Ser. No. 08/402,041 and 09/006,591, respectively entitled "Color Shifting Film" and "Optical Film" commonly assigned to Minnesota Mining and Manufacturing and which are hereby incorporated by reference. The described thin polarizer films offer improved performance both in terms of device thickness and optical benefits. The described films offer wider angle acceptance and better color separation than traditional polarizing devices and are an important component of preferred embodiments of the present invention.

In an alternative embodiment, the polarizing stack may include a reflective circular polarizer and a quarter wave retarder. Alternatively, the functions of the reflective polarizer may be provided by a cholesteric polarizer followed by a quarter wave film as described by Coates, et. al. in the SID 96 Applications Digest (pages 67 and following). Those skilled in the art will recognize that other combinations of films reflecting one linear polarization state as circularly polarized light and transmitting the other linear polarization state may be used in this device.

FIG. 3 illustrates the operation of the polarization converter 110 in accepting an unpolarized light beam 170 on the input side and providing a substantially linearly polarized light beam 172, 176 on the output side. The term light is intended to include forms of electromagnetic radiation including visible light, infrared, and ultraviolet. The beam of light 170 has a direction of travel, and the beam 170 may be collimated, diverging or converging. In the exemplary embodiment illustrated in FIG. 3, the individual beam of light 170 is collimated because the lenslets are cylindrically symmetric.

The unpolarized beam of light 170 including both s-components and p-components enters the input lenslet array 120, and is focused by the individual lenslets 124 to the focus 126. As the transmissive aperture regions 134 are aligned with a focus 126, the beam of light 170 passes generally undisturbed into and through the quarter wave retarder 142. The beam 170 next impinges upon the reflective polarizer 150. The p-polarization component 172 is transmitted through the reflective polarizer 150 and passes through the positive lenslet 162 in the output collimating lenslet array 160. The positive lenslet 162 returns the p-component to its original state of collimation.

The reflective polarizer 150 reflects the s-polarization component 174. A quarter-wave retarder converts linearly polarized light to a circularly polarized state, and vice versa. Accordingly, the reflected component 174 becomes circularly polarized as it passes through the quarter wave retarder 142. The mirror surfaces 132 are optically aligned to receive the reflected component 174. The circularly polarized component 174 is reflected by the concave curved mirror surfaces 132 and once again it passes through the quarter wave retarder 142 becoming a p-polarized component 176. The now p-polarized component 176 passes through the reflective polarizer 150 and into the output lenslet array 160. The negative lenslets 164 are optically aligned with the mirror surfaces 132 to receive the newly p-polarized component 176 and return the component 176 to the original state of collimation.

Figure 4:
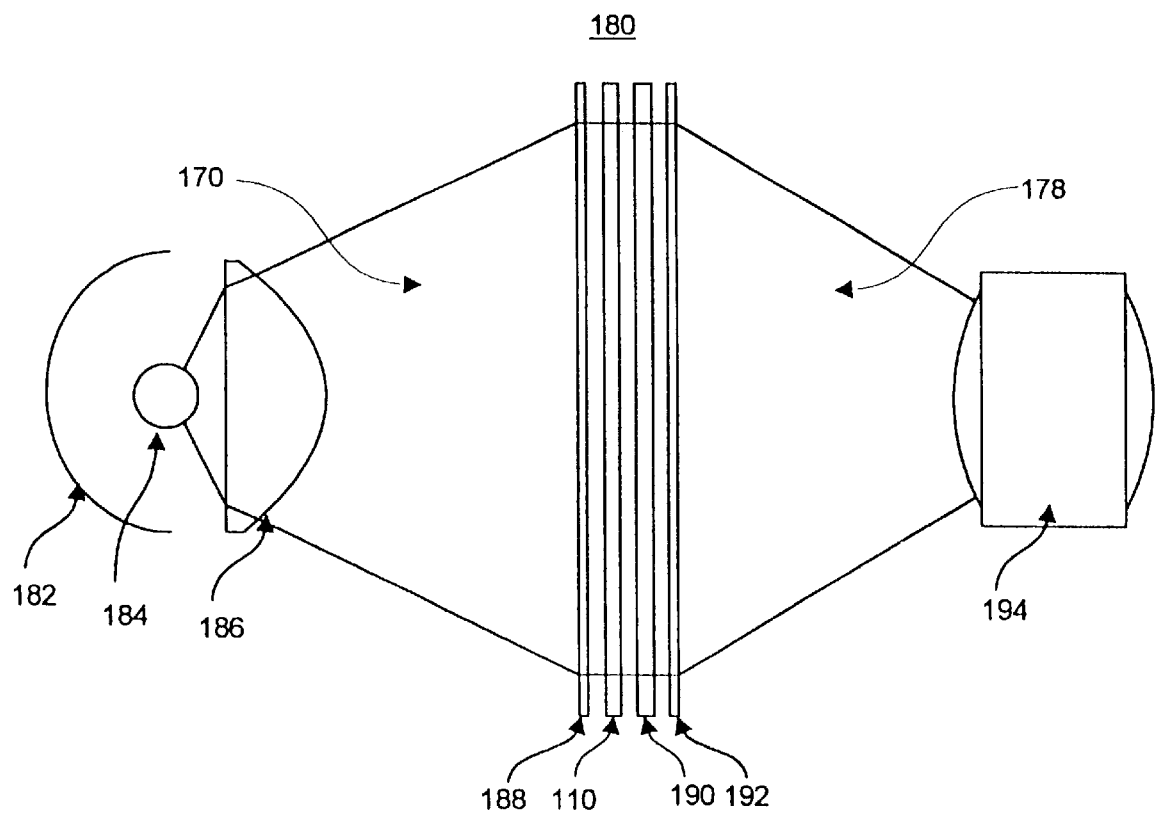
FIG. 4 is a cross-sectional elevation view of a LCD projector assembly in accordance with the present invention.

FIG. 4 illustrates a straight-line configuration of a single-panel LCD projector assembly 180 including the polarization converter 110 illustrated in FIGS. 2–3. The projector assembly 180 includes a back spherical reflector 182, a light source 184, a condenser lens 186, a collimating Fresnel lens 188, the planar polarization converter 110, a single panel LCD 190, a field Fresnel lens 192, and projection lens 194 all optically aligned in sequence. Although the projector assembly 180 is illustrated in FIG. 4 as being located along a generally straight path, those skilled in the art will recognize that a variety of different arrangements, including for example mirrors or light deviators that bend or compress the light path, may be employed without departing from the concepts of the present invention.

The light source 184 generally is positioned near the radius of curvature of the back spherical reflector 182 and behind the glass condenser lens 186. The term light source is intended to include any source of radiation used in conjunction with a projection system, including incandescent (such as tungsten-halogen), metal halide, and other arc discharge lamps, as well as other sources of light known in the art. In the projector assembly 180, the light source 184 is a 400-watt discharge lamp of the metal-halide type, such as the Osram type HMP 400 DE, from Osram, GmbH Munich, Germany.

The light source 184 produces unpolarized light 170 which is directed forward by the spherical reflector 182 and refracted by the condenser lens 186. In the present exemplary embodiment, the rear glass spherical reflector 182 has a radius of curvature of 32.6 mm with a dichroic reflective coating. The condenser lens 186 is a glass aspheric condensing lens that receives the light rays 170 from the light source 184 and directs the resulting light beam to a 90 mm focal length Fresnel collimating lens 188 placed about 90 mm from the light source 184.

The light source 184, the planar polarization converter 110, and accompanying light management components such as the back spherical reflector 182, the condenser lens 186, and the collimating Fresnel lens 188 form a polarized light source assembly.

The Fresnel lens 188 collimates the diverging unpolarized light beam 170. The planar polarization converter 110 converts the unpolarized collimated light beam 170 into linearly polarized collimated light beams that impinge on the single-panel LCD 190.

The polarized light beams from the polarized light source assembly pass through the LCD panel to form an image beam 178. The Fresnel field lens 192 converges the image beam 178 to the projection lens 194. The projection lens 194 projects an image of the LCD panel 190 to a screen for display.

In the present exemplary embodiment, the assembled planar polarization converter 120 is about 142 mm wide by 110 mm high by 3 mm thick, and is placed in front of a 165 mm diagonal SVGA TFT-LCD panel 190, such as the Sharp Model No. LQ64SP1, from Sharp, Inc., Nara, Japan. The linear grooves of the polarization converter may be oriented orthogonal to the polarization transmission axis of the LCD panel 190, or the grooves may be arbitrarily oriented and a halfwave retarder film (e.g., the Polaroid ½ wave retarder PID#605208 from Polaroid Corporation, Norwood, Mass.) used to rotate the polarization to the proper angle. The converging Fresnel lens 192 has a 152 mm focal length and converges the light to the projection lens 194, a 167 mm focal length, f/5.6 three-element projection lens which projects an image of the LCD panel.

Those skilled in the art will recognize that numerous input and output lenslet configurations may be possible. For example, in alternative the input and/or the output lenslet arrays may be cylindrically symmetric or rotationally symmetric. The lenslets may be convex or concave and each lenslet may be single piece continuous or be separated into two or more discontinuous parts. The lenslets may be circular, Cartesian Ovals, optimized aspherics or faceted in cross-section. Similarly, the reflective regions may be comprised of cube corners or be circular, elliptical, optimized aspherics faceted in cross-section.

Figure 5:
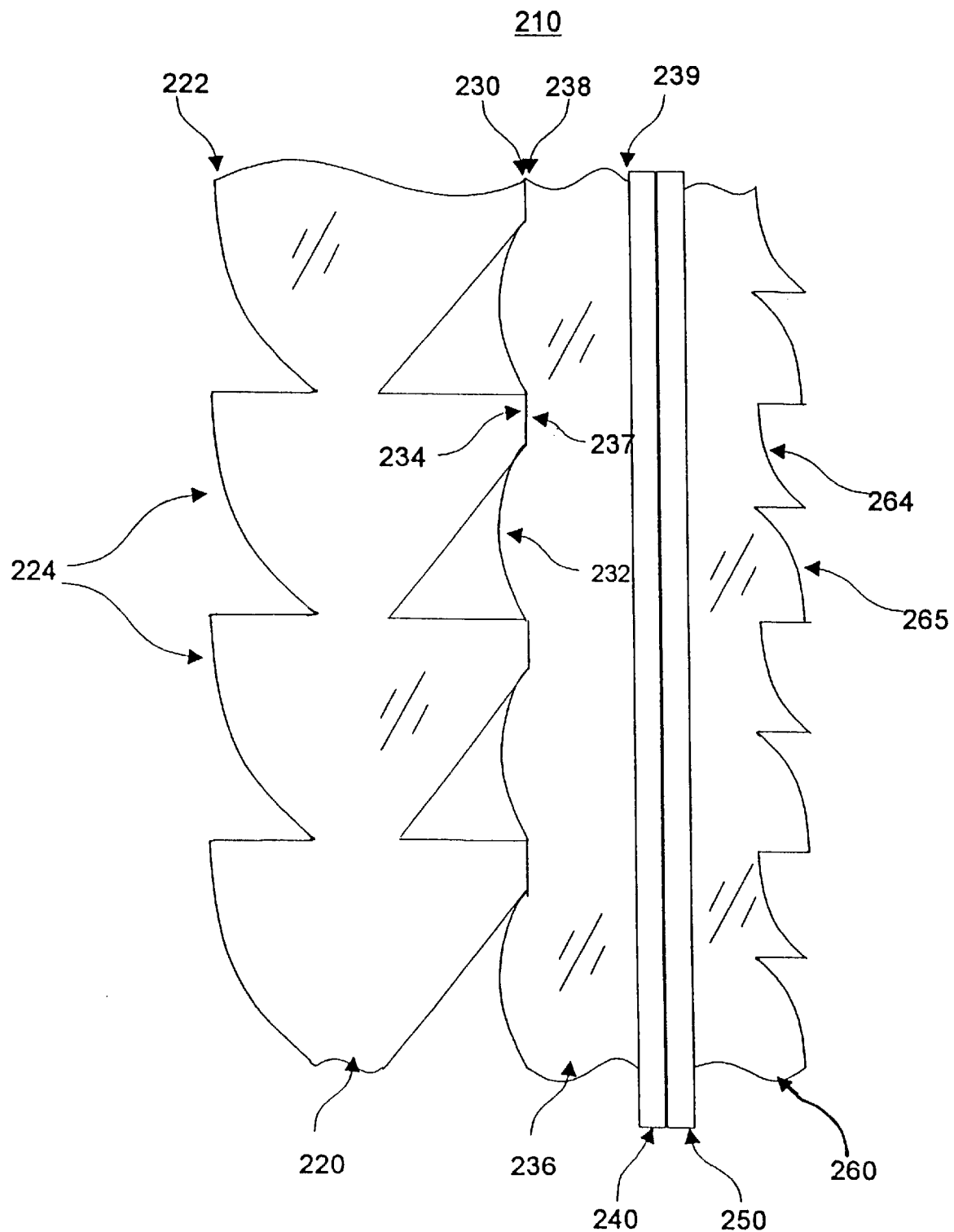
FIG. 5 is a cross-sectional elevation view of a second planar polarization converter in accordance with the present invention.

A second embodiment of a polarization converter 210 in accordance with the present invention is illustrated in FIG. 5. The polarization converter 210 similarly includes an input lenslet array 220, a quarter wave retarder 240, a reflective polarizer 250, and an output lenslet array 260 stacked in sequence and optically aligned. The polarization converter 210 further includes an additional spacing optical element 236 placed between the first lenslet array 220 and the quarter wave retarder 240.

The input lenslet array 210 has a first major surface 222 and a second major surface 230. The first surface 222 is a focusing surface similar in shape to the first surface 122 of the input lenslet array 120 illustrated in FIGS. 2–3. The first major surface 222 includes a plurality of positive lenslets 224. The second major surface 230 includes a plurality of transmissive regions 234, each region 234 optically aligned to transmit the light focused by a corresponding lenslet 224.

The optical element 236 is generally transparent and preferably comprises a material having the same refraction index as the input lenslet array, such as acrylic. The optical element 236 has a first face 238 and a second generally planar face 239. The first face 238 includes cylindrical or spherical mirrors 232 interdigitated with transmissive regions 237. The transmissive regions 234 and the transmissive regions 237 are aligned adjacent to one another. Both transmissive regions 234 and 237 are generally planar, thus reducing or eliminating a boundary air gap. In other alternatives, other matching shapes are possible. Elimination of the air gap results in diminished reflection losses. Although in a preferred embodiment regions 234 and 237 are both generally aligned and similar in size, those skilled in the art will recognize that the transmissive regions may differ in size and alignment as long as the transmissive regions are aligned with the focal point of the lenslets 224.

The path of the beam of light through the device illustrated in FIG. 5 is similar to the path as illustrated in FIG. 3. However, the beam does not pass into air before being reflected by the mirror surfaces 232, thereby avoiding further Fresnel reflection losses. As in the polarization converter 110, the mirrors 232 of the polarization converter 210 refocus the light beyond the lenslet array, resulting in the use of negative lenslets 264 to return the light to its original state of collimation.

Figure 6:
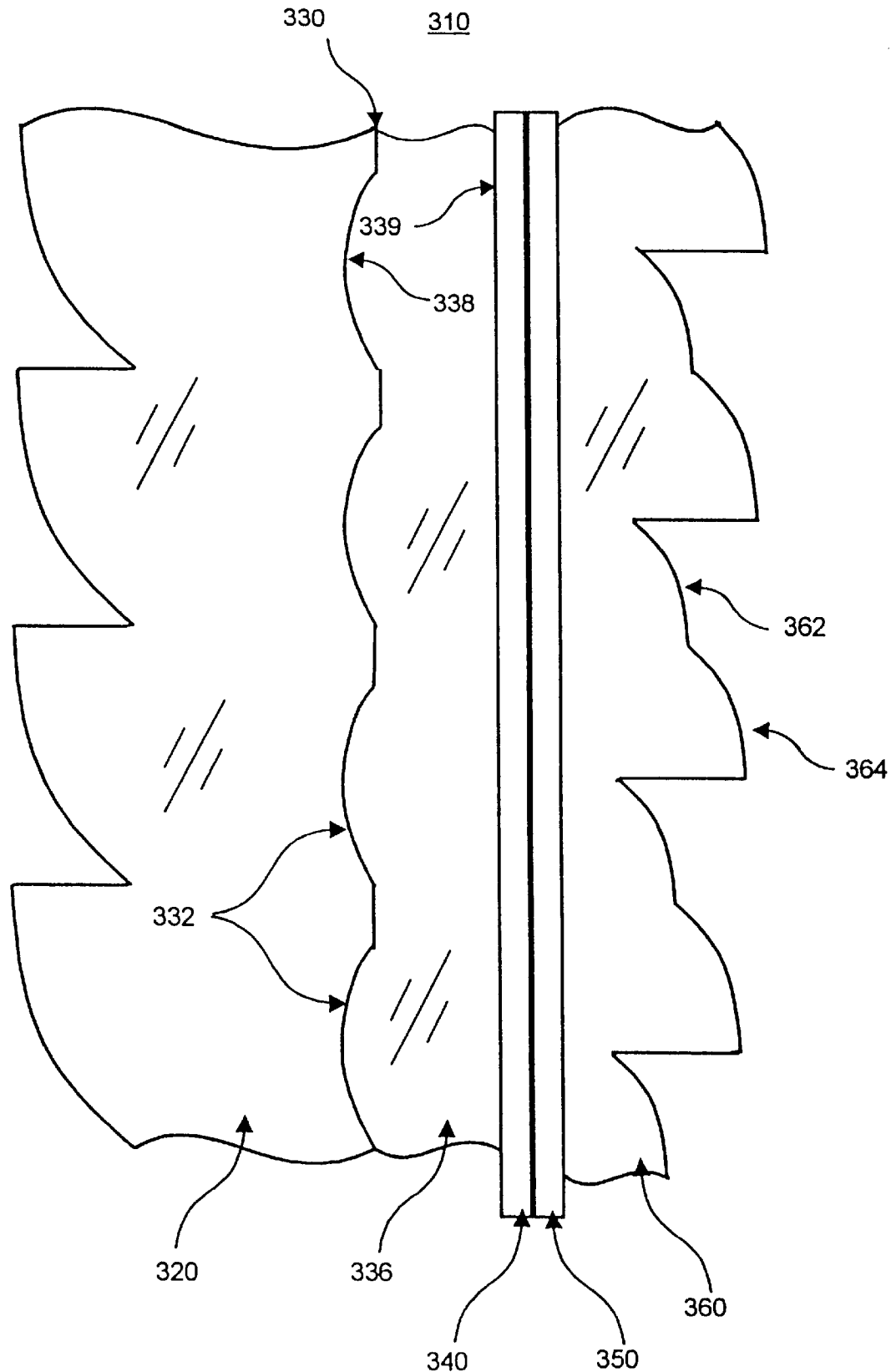
FIG. 6 is a cross-sectional elevation view of a third planar polarization converter in accordance with the present invention.

An alternative planar polarization converter polarization converter 310 illustrated in FIG. 6 is similar to the polarization converter 210. Similar elements in the different illustrated embodiments share reference numerals having the same last two digits. A matching spacer element 336 is located between an input lenslet array 320 and a quarter wave retarder 340, that is, the spacer element has outer surfaces that correspond to opposing surfaces of the input lenslet array 320 and the quarter wave retarder 340. In other words, the spacer element 336 has a first surface 338 that matches or corresponds to a second surface 330 of the input lenslet array 320, and a second surface that matches the opposing surface of the quarter wave retarder 340. If the spacer is formed of a solid material prior to assembly, the reflective mirror coating may be applied to either the rear surface 330 of the input lenslet array or the entrance surface 338 of the spacer. Alternatively, the spacer could be formed by casting plastic or injecting optically clear adhesive into the cavities forming the reflecting surfaces after the reflective coating is applied to surface 330. The fit between opposing surfaces eliminates or reduces boundary air gaps. The spacer element 336 is selected of a material having generally the same index of refraction as the input lenslet array element 320, thus further reducing Fresnel reflection losses. The polarization converter further includes a reflective polarizer 350 and an output lenslet array 360 stacked in sequence and optically aligned.

The mirrors 332 of the alternative polarization converter 310 illustrated in FIG. 6 have a shorter radius of curvature than those of the polarization converters 110 and 210. As a result, the mirrors 332 focus the light in the vicinity of the output lenslet array 360. This arrangement allows the use of convex lenslets 364 to return the light to its original state as illustrated in FIG. 6.

Figure 7:
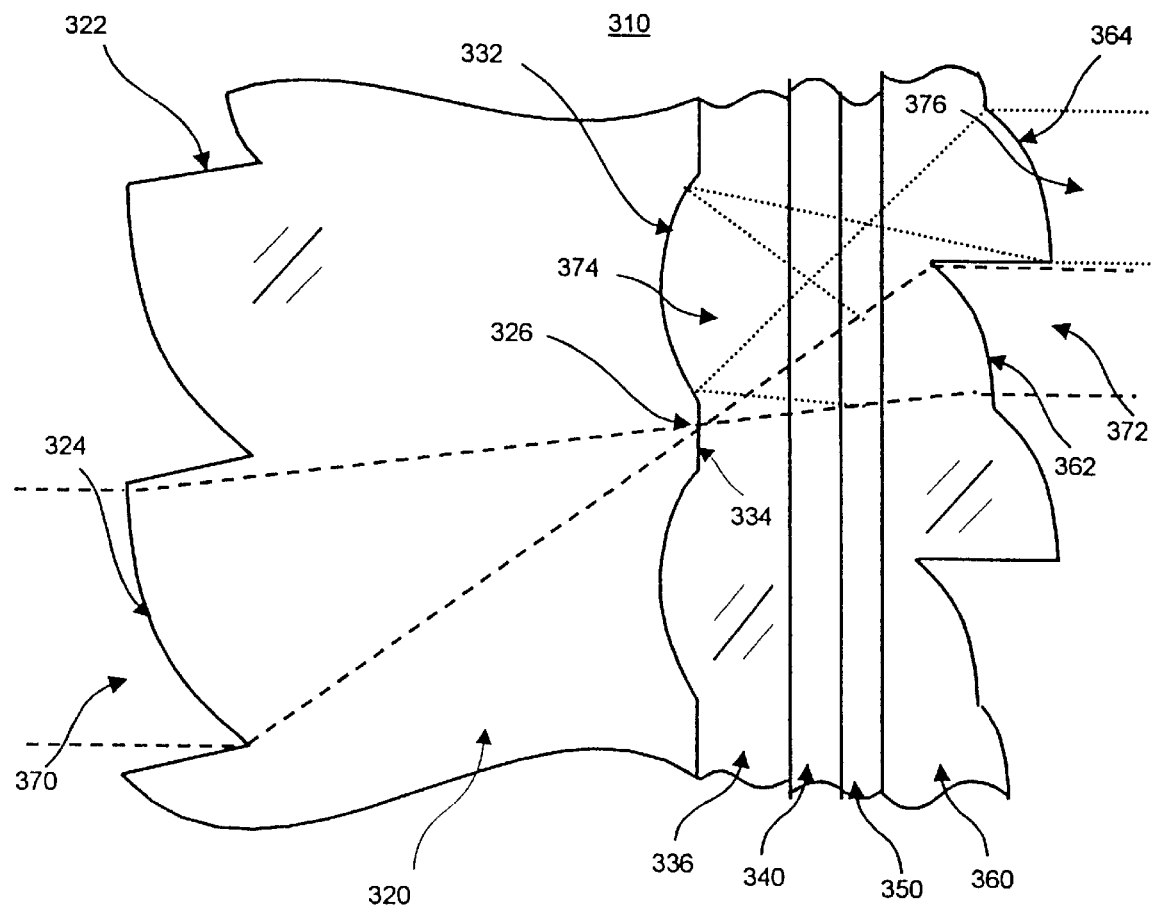
FIG. 7 is a cross-sectional elevation view of a detail of the planar polarization converter illustrated in FIG. 6.

The path that incident light 370 would follow is illustrated in FIG. 7. An unpolarized light beam 370 enters the input lenslet array 320 through a lenslet 324 that brings the beam to a focus in the vicinity of an aperture or transmissive region 334. The beam 370 then passes through the spacer optical element 336 and the quarter wave retarder 340. The beam next enters the reflective polarizer 350. The p-polarization component is transmitted and passes into the output lenslet array 360 and is returned to its original state of collimation, convergence or divergence by a positive lenslet 362. The s-polarization component is reflected by the reflective polarizer 350 and passes back through the quarter wave retarder 340 becoming circularly polarized. The circularly polarized component passes through the spacer optical element 336 and is reflected by the curved mirror 332 which brings the beam to a focus in the vicinity of the second lenslet 364 of the output lenslet array 360. On the way to its focal point, the beam passes through the quarter wave retarder 340 that converts it to p-polarization, thus allowing it to pass through the reflective polarizer 350. After diverging from its focus, the beam is returned to its original state of collimation, convergence or divergence by lenslet 364. Alternative embodiments may include rotational symmetric lenslet arrays. Potentially rotational symmetrical lenslet arrays double the angular extent of the beam in both directions transverse to the beam but allow the polarization converter to work with converging, diverging, or collimating light.

Figure 8:
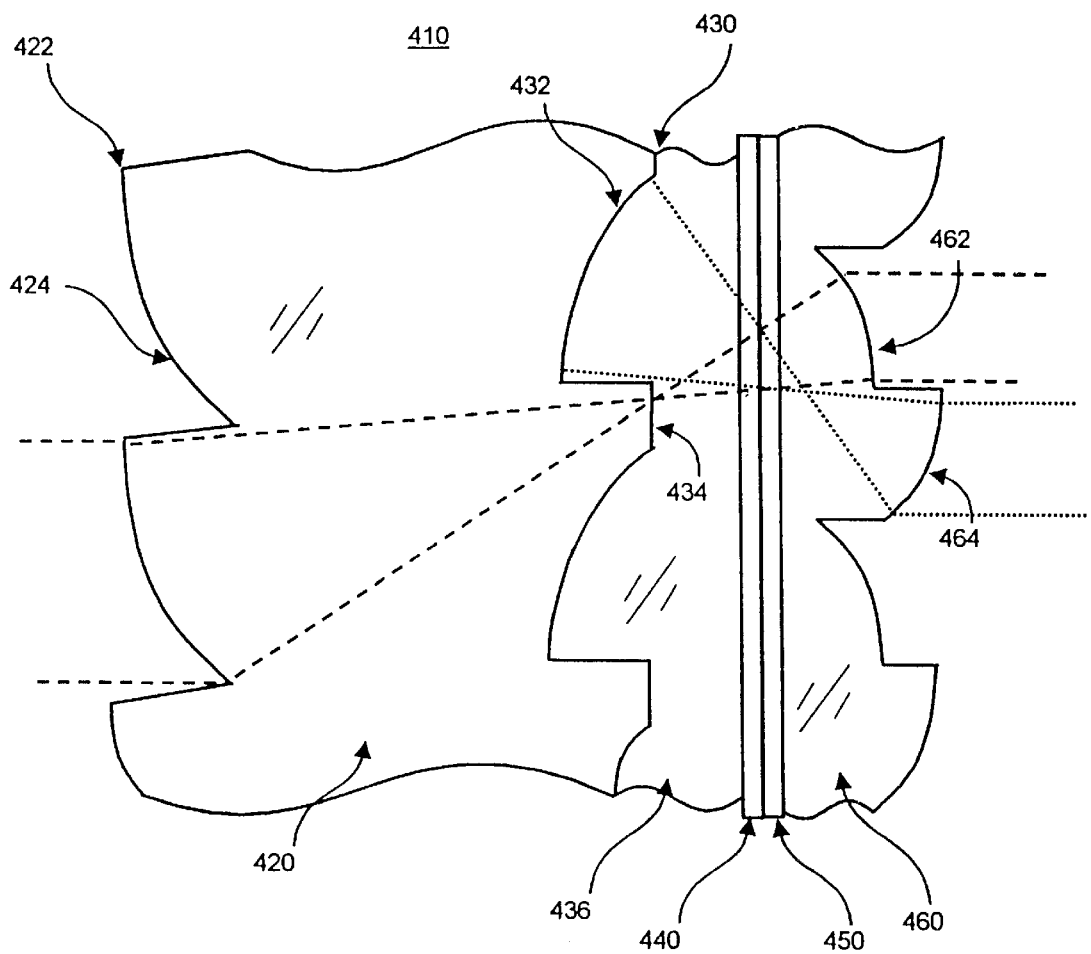
FIG. 8 is an enlarged cross-sectional elevation view of a detail of a fourth planar polarization converter in accordance with the present invention.
Figure 9:
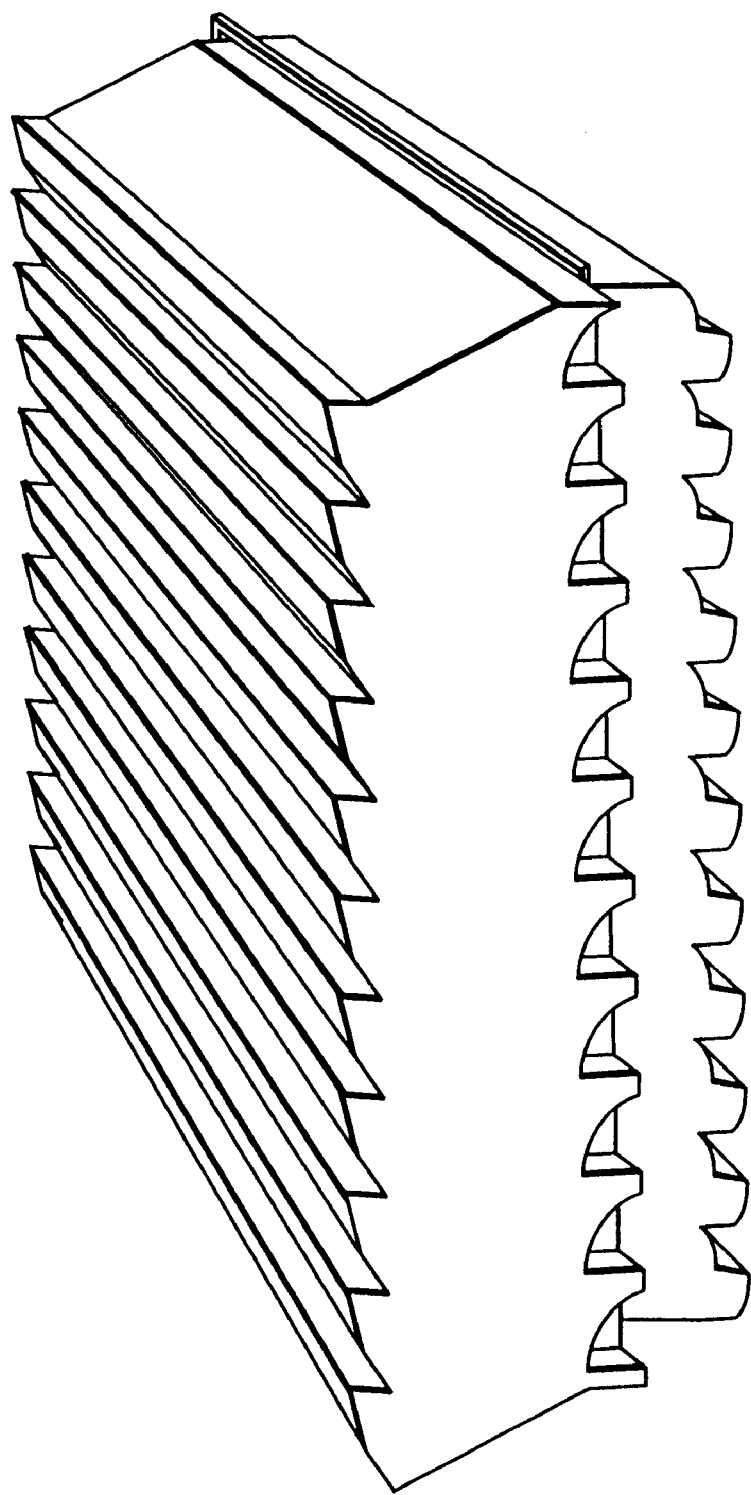
FIG. 9 is a perspective view of the cylindrically symmetric lenslets of the planar polarization converter illustrated in FIG. 8.

A fourth embodiment of the present invention is illustrated in FIG. 8. A polarization converter 410 includes an input lenslet array 420, a corresponding spacer element 436, a quarter wave retarder 440, and reflective polarizer 450, and an output lenslet array 460. The input lenslet array 420 includes a plurality of lenslets 424 on a first surface 422 and a plurality of alternating mirrors 432 and transmissive regions 434 on a second surface 430. The transmissive regions 434 are aligned to transmit the beam focused by the lenslets 424. The mirrors 432 are curved and slanted and are positioned to reverse the light path of the reflected component such that the second focus point for an impinging beam 470 is a mirror image of the first, rather than being displaced vertically in the figure. The arrangement of the mirrors allows each mirror 432 to work on axis, thus producing a better image. The output lenslet array 460 of the polarization converter 410 includes alternating upper and lower positive lenslets 462 and 464. These lenses are similar to the lenses 362 and 364 in the previous embodiment, except that the tilt of lens 464 is reversed to accommodate the reversed tilt of the light path. FIG. 9 is perspective three-dimensional view of this embodiment.

Figure 10:
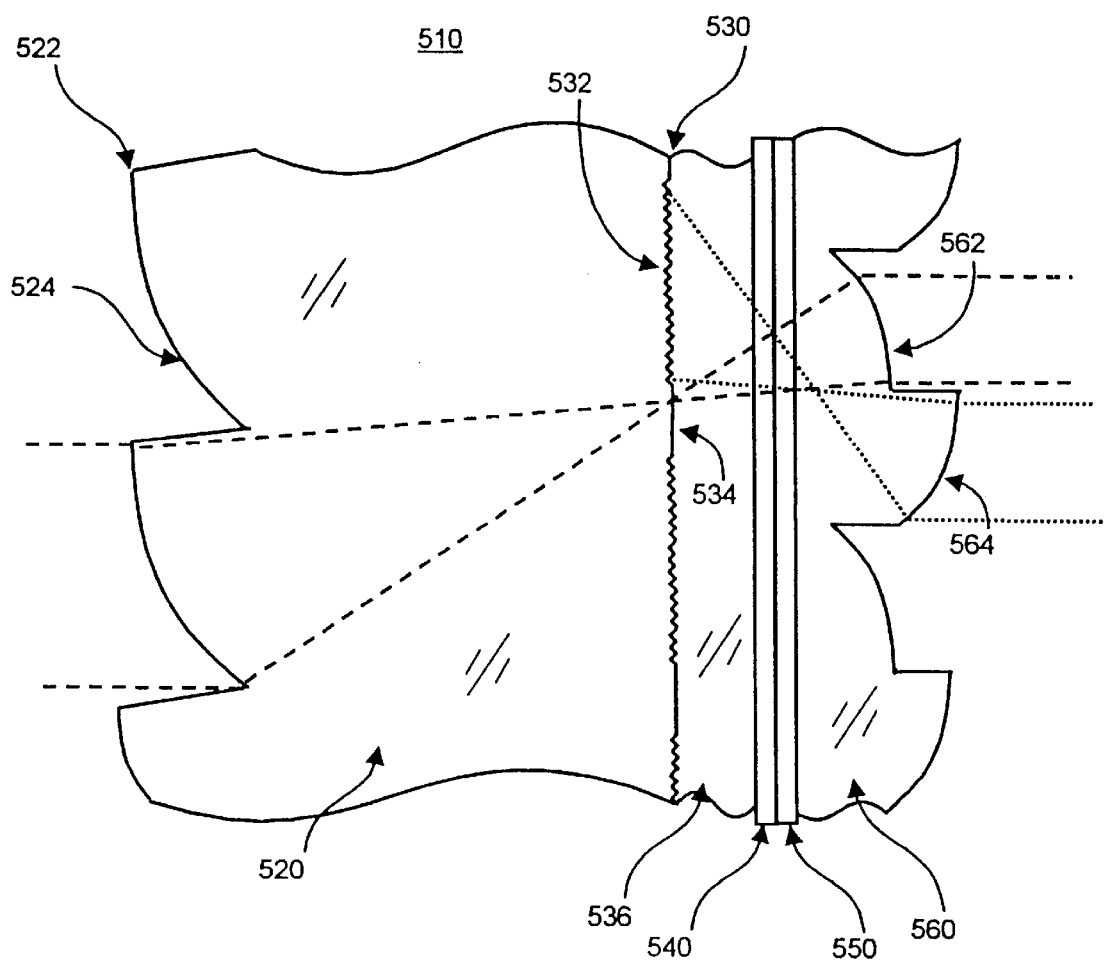
FIG. 10 is an enlarged cross-sectional elevation view of a detail of a fifth planar polarization converter in accordance with the present invention.

FIG. 10 illustrates a fifth embodiment of a polarization converter 510 in accordance with the present invention. The polarization converter 510 has an identical arrangement to the polarization converter 410 depicted in FIG. 9, with the exception that the spherical or cylindrical mirrors 432 in FIG. 8 are replaced by a Fresnel mirror or an array of corner cubes. Fresnel mirrors are similar to Fresnel lenses in their construction, except that the facets are coated with a reflective coating.

Figure 11:
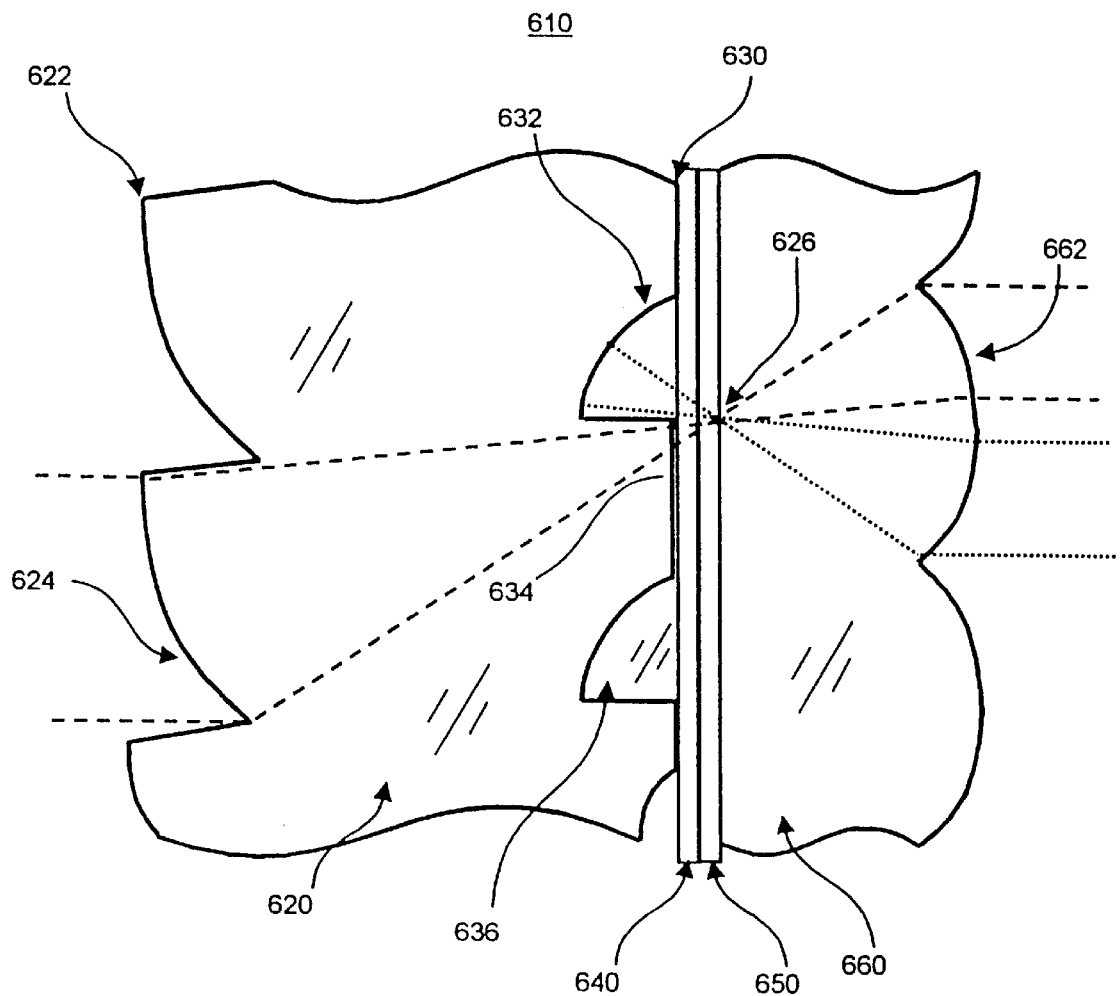
FIG. 11 is an enlarged cross-sectional elevation view of a detail of a sixth planar polarization converter in accordance with the present invention.

FIG. 11 illustrates a sixth embodiment of a polarization converter 610 in accordance with the present invention. This embodiment is again similar to the one shown in FIG. 8. The first difference is that the lenslets 624 do not focus the light at the aperture 634, but rather at the reflective polarizer 650. Furthermore, the mirrors are designed to focus the light back on itself so that the focus of the reflected beam is generally coincident with the first focus 626. This makes it possible to combine the two lenslets (462 and 464 in FIG. 8) into a single continuous lenslet 662. Such an arrangement simplifies manufacturing of the lenses.

As with the preceding embodiments, it is possible to make this embodiment with rotationally symmetric lenslets. A perspective projection of the rotationally symmetric configuration is shown in FIG. 12. The lenslets are arranged in a hexagonal close packed topology and truncated to half-hexagons for maximum light utilization.

Following is a prescription for an embodiment of the lenslet array 620 in accordance with the present invention. The lenslet array is cylindrically symmetric; in other words, the cross-section shown in FIG. 11 may be extruded to form the actual parts. The material for the lenslet array is acrylic plastic (polymethylmethacrylate). The focal length of the lenses of the input lenslet array is 2.0 millimeters. Because the refractive index of acrylic is roughly 1.493, the vertex radius of curvature is 0.66 mm. In the present embodiment, the curve of the lenses is circular and this limits the speed of the lens to F/3. In the present embodiment, the aperture of the input lenslets is chosen to be 0.5 millimeters, so they operate at F/4. Alternately, the curve of the lenses may be a Cartesian oval. To correct the spherical aberration of the lens for incoming collimated light, the proper Cartesian Oval is an ellipse with an eccentricity equal to the reciprocal of the refractive index, or approximately 0.67 for acrylic. Another possibility would be to optimize the curve to provide an appropriate balance of spherical aberration with coma so as to maximize the light throughput of the device. The may be accomplished by one skilled in the art with any of the commercially available lens design programs. Furthermore, the lenses could be made as Fresnel lenses, in which the continuous curved surfaces are replaced by a series of facets. Whichever curve is chosen, it is truncated by a generally horizontal plane that bisects the curve, as shown in FIG. 11.

Commercially available quarter wave retarder film is approximately 0.1 mm thick, and DBEF, the 3M reflective polarizer, is approximately 0.18 mm thick, with the reflected polarization being reflected near the center of this thickness. In this particular embodiment, it is desired to have the focal point of the input lenslet array near the reflecting region of the reflective polarizer. Accordingly, the thickness of the input lenslet array is chosen to be 1.8 millimeters. The output lenslets have a focal point coincident with that of the input lenslets, and a focal length half that of the input lenslets. The resulting vertex radius of curvature is 0.33 mm., and the thickness of the material is 0.9 mm., which is the focal length of the lenslets less half the thickness of the reflective polarizer. Again, the profile of the output lenslets may be circular, the appropriate Cartesian Oval, Fresnel lenses, or an optimized shape, but in this embodiment it is not truncated at the center as the input lenslets are. The reflective portion of the input lenslet array is circular in cross-section, with its center of curvature coincident with the focal point of the input lenslet array. Alternatively, the reflective portion could be a Fresnel mirror, that is, a series of grooves with a reflective coating. Other arrangements are used in other embodiments, but reflecting the light exactly back on itself minimizes aberrations. The only free parameter for the reflective surfaces is the radius of curvature. The radius is chosen to be small enough that the interdigitated transmissive sections pass substantially all of the available light, but large enough that it captures all of the light reflected by the polarizer. As the input lenslets have been chosen to be F/4, the marginal ray angle is 14.5°. The shortest possible radius is that of a circle intersecting the plane of surface 630 at the point intersected by a line inclined at 14.5° and passing through the focal point of the lenslets. The intersection height of this line is roughly 0.05 millimeters, so the shortest possible radius is approximately 0.21 millimeters. To calculate the largest possible radius, we assume that the incident light emanates from a point source. The marginal ray of the incoming beam then has an intersection height on the transmitting portion of the input piece of 0.05 mm, which allows for an intersection height of the reflection portion of 0.45 mm. Application of Pythagoras' theorem yields a radius of curvature of 0.49 millimeters as the maximum. To minimize the sensitivity to manufacturing variations while still allowing for an extended light source, a radius of curvature of 0.35 millimeters is chosen.

The present invention offers a thin plate-like polarization converter having very high efficiency. The use of spacer elements further reduces possible air to glass interface losses. The use of rotationally symmetric lenslet arrays allows for the utilization of converging, diverging or collimating light. The availability of embodiments using only positive lenses further improves the desirability of the present invention.

The embodiments described and illustrated herein are illustrative only, and are not to be considered as limitations upon the scope of the present invention. Those skilled in the art will recognize that other variations and modification may be made in accordance with the spirit and scope of the present invention.

What is claimed is:

1. A polarization converter for polarizing a beam of unpolarized light, the polarization converter comprising:
   an input lenslet array element including
      a focusing surface having a plurality of focusing lenslets, each focusing lenslet having a focus and
      a reflective/transmissive surface having at least one reflective region and at least one transmissive region, at least one of the focusing lenslets having a focus optically aligned with at least one transmissive region;
   an output lenslet array including a plurality of collimating lenslets
   a polarizing stack positioned between the input and output lenslet arrays that transmits a first component of the unpolarized light beam and reflects a second component of the unpolarized light beam;

wherein the input lenslet array, the output lenslet array and the polarizing stack are optically aligned with respect to each other.

2. The polarization converter of claim 1, the polarizing stack comprising
a reflective polarizer;
a quarter wave retarder positioned between the input lenslet array and the reflective polarizer, wherein the quarter wave retarder circularly polarizes the second component;
wherein the input lenslet array element, the output lenslet array element, the reflective element, the quarter wave retarder, and the reflective polarizer are optically aligned with respect to each other.

3. The polarization converter of claim 1, wherein the reflective regions include generally concave mirrors.

4. The polarization converter of claim 1, wherein the transmissive regions include generally flat regions generally perpendicular to a normal plane, and wherein the reflective regions and the transmissive regions are interdigitated with respect to each other.

5. The polarization converter of claim 1, further comprising an optical spacer element placed between the focusing lenslet array and the quarter wave retarder film.

6. The polarization converter of claim 5, the spacer element having outer surfaces that correspond to opposing surfaces of the input lenslet array and the quarter wave retarder.

7. The polarization converter of claim 5, wherein the reflective region is integral with the spacer element.

8. The polarization converter of claim 1, wherein the input lenslet arrays are cylindrically symmetric.

9. The polarization converter of claim 8, wherein the output lenslet arrays are cylindrically symmetric.

10. The polarization converter of claim 1, wherein the input lenslet arrays are rotationally symmetric.

11. The polarization converter of claim 10, wherein the output lenslet arrays are rotationally symmetric.

12. The polarization converter of claim 1, wherein the input lenslet array element comprises convex focusing lenslets.

13. The polarization converter of claim 12, wherein the output lenslet array comprises alternating convex and concave lenses.

14. The polarization converter of claim 1, wherein the output lenslet array comprises alternating positive and negative lenses.

15. The polarization converter of claim 1, wherein the output lenslet array comprises positive lenses.

16. A polarization converter for polarizing unpolarized light, the polarization converter comprising:
a focusing lenslet array including a plurality of focusing lenslets;
a collimating lenslet array including a plurality of collimating lenslets; and
a polarizing stack including a polarizer film located between the focusing lenslet array and the collimating lenslet array,
wherein the polarizing stack and the collimating lenslet array are optically aligned with the focusing lenslet array to receive an image focused by the focusing lenslets.

17. The polarization converter of claim 16, wherein the polarizer is a reflective polarizer, the polarizing stack further including a quarter wave retarder, wherein the reflective polarizer transmits a first polarization component and reflects a second polarization component.

18. The polarization converter of claim 17, the polarizing stack further including a reflective surface including a plurality of mirrored regions optically aligned to receive and reflect the second polarization component and a plurality of transmissive regions optically aligned to transmit the image focused by the focusing lenslets.

19. An LCD projection assembly including the polarization converter of claim 1.

20. An LCD projection assembly including the polarization converter of claim 14.

21. A polarization converter for polarizing a beam of unpolarized light having a direction of travel, the polarization converter comprising:
a focusing means for focusing the beam of unpolarized light into a focused beam;
a polarizing means for transmitting a first polarization component and reflecting a second polarization component;
a reflective means optically aligned to receive and reflect the second polarization component; and
an output realigning means for receiving the first polarization component and the reflected polarization component and realigning the polarization components in the direction of travel.

22. An LCD projection assembly comprising the polarization converter of claim 21.

23. A polarized light source assembly including the polarization converter of claim 21.

24. A liquid crystal display projection assembly comprising:
a light source for producing an unpolarized light beam;
a polarization converter optically aligned to receive the unpolarized light beam and for producing a polarized light beam, the polarization converter comprising:
an input lenslet array element including
a focusing surface including a plurality of focusing lenslets, each focusing lenslet having a focus,
a reflective surface having a plurality of mirror surfaces and a plurality of transmissive regions, at least one focusing lenslet having a focus point optically aligned with at least one transmissive region,
a quarter wave retarder,
a reflective polarizer, and
an output lenslet array including a plurality of output lenslets;
wherein the input lenslet array element, the quarter wave retarder, the reflective polarizer and the output lenslet array are optically aligned and stacked with respect to each other; and
a liquid crystal display optically aligned to receive the polarized light beam.

25. A polarization converter for polarizing a beam of unpolarized light, the polarization converter comprising:
an input lenslet array;
an output lenslet array; and
a reflective polarizer positioned between the input lenslet array and the output lenslet array, wherein the reflective polarizer reflects one polarization component of the beam of unpolarized light and transmits a second polarization component of the beam of unpolarized light, and wherein the input lenslet array includes reflective elements that substantially reflect the first polarization component back towards the reflective polarizer.

* * * * *